United States Patent [19]

Frank

[11] 4,258,993
[45] Mar. 31, 1981

[54] LIGHT DISCRIMINATION APPARATUS

[75] Inventor: Lee F. Frank, Rochester, N.Y.

[73] Assignee: Eastman Kodak Company, Rochester, N.Y.

[21] Appl. No.: 51,552

[22] Filed: Jun. 25, 1979

Related U.S. Application Data

[63] Continuation of Ser. No. 729,624, Oct. 5, 1976, abandoned.

[51] Int. Cl.³ .............................................. G03B 7/081
[52] U.S. Cl. .............................. 354/60 A; 250/214 P
[58] Field of Search ................... 354/22, 23 R, 24, 31, 354/42, 49, 60 R, 59, 60 A; 352/141; 250/214 P, 226; 356/218, 226, 222–225

[56] References Cited

U.S. PATENT DOCUMENTS

| | | | |
|---|---|---|---|
| 2,730,654 | 1/1956 | Rabinow | 315/83 |
| 3,246,586 | 4/1966 | Hunt | 354/23 R |
| 3,475,616 | 10/1969 | Stimson et al. | 354/31 X |
| 3,500,730 | 3/1970 | Matsubara et al. | 354/31 |
| 3,651,749 | 3/1972 | De Groot | 354/31 |
| 3,672,268 | 6/1972 | Scheibel | 354/31 |
| 3,850,530 | 11/1974 | Uno et al. | 354/31 X |
| 4,041,308 | 8/1977 | Fujita | 250/214 P X |
| 4,079,388 | 3/1978 | Takahama et al. | 354/31 |

Primary Examiner—Donald A. Griffin
Assistant Examiner—W. B. Perkey
Attorney, Agent, or Firm—Thomas H. Close

[57] ABSTRACT

A control apparatus is disclosed for discriminating between light emitted from sources having respectively different flicker ratios (the ratio of the brightest and the dimmest intensities during a given time period). A photocell produces a voltage having a DC component proportional to the log of the average intensity of incident light and an AC component proportional to the log of the flicker ratio. After the DC component is removed, the AC component is amplified and may be applied to a filter-moving control means to cause appropriate color-correcting filters to be interposed between the scene and photosensitive material, as for instance in a camera. Alternatively, the AC component may control a marking mechanism to encode the film with a mark readable during the subsequent printing process.

6 Claims, 2 Drawing Figures

LIGHT DISCRIMINATION APPARATUS

This is a continuation of application Ser. No. 729,624, filed Oct. 5, 1976, now abandoned.

BACKGROUND OF THE INVENTION

1. Field of the Invention

The present invention relates to apparatus for discriminating between light emitted from sources having respectively different ratios of brightest to dimmest intensities during a given time period. Such apparatus is particularly useful in cameras wherein one or more corrective filters, which compensate for differences in color temperature of light sources, may be moved into and out of the optical path to provide correct color balance and exposure. Alternatively, the film may be exposed and encoded so that compensation may be effected during printing.

2. Description of the Prior Art

It is well known that color film which is sensitized to be balanced for indoor tungsten illumination must be used with a color compensating filter if it is to be used outdoors in natural sunlight. Of course, film sensitized for natural light would need a filter when used indoors. In prior art cameras havin automatic color filter control, electrical means have been provided for measuring the spectral characteristics of scene illumination and for automatically moving filters into and out of the optical path to correct the spectral transfer characteristics of the camera lens systems, depending upon the scene illumination characteristics and the spectral characteristics of the film.

In determining whether the scene is illuminated by natural or artificial light, some prior art devices measure the amount of infrared components in the scene light, as for example in U.S. Pat. No. 3,651,749 entitled "Exposure Control Apparatus" and which issued to G. H. DeGroot on Mar. 28, 1972. Other known cameras, operating on the same "spectral characteristic" principle, have means for comparing the relative amounts of red and blue light from the scene. By assuming that when the scene light is predominantely red, the photograph is being taken indoors and that when the scene light is mostly blue, the scene is outdoors, the camera can automatically adjust its filtering system in accordance with the perceived illumination source. U.S. Pat. No. 3,475,616 entitled "Automatic Color Filter Control" and which issued on Oct. 28, 1969 to A. G. Stimson et al discloses such a system.

While such devices normally work well for their intended purposes, they can be "fooled" as, for instance, when there is an unusual amount or lack of infrared light in a naturally or artificially lighted scene, or when a scene is dominated by single colors which might be used by the camera mechanism to indicate the light source.

Further, the prior art devices do not readily enable discrimination between different sources of artificial light, such as for example between fluorescent and tungsten lamp sources.

SUMMARY OF THE INVENTION

In accordance with the present invention, I have provided apparatus for differentiating between different sources of artificial light and between artificial and natural light independently of the spectral content of the scene.

Different light sources have characteristic temporal "signatures" or flicker ratios (the ratio of the brightest instantaneous light to the dimmest instantaneous light) emitted by the source. Further, this flicker ratio for a given type of light source is substantially invariant over a wide range of powers. By producing a signal determined by the fractional variation in light intensity, the signal can be used to position a correct compensating filter in the optical path of a camera or other such device for exposing color film, thereby resulting in truer colors in the pictures taken under natural and various aritifical illumination. In another embodiment, the signals may be used to encode the film, the code being usable to control the printing process.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

The present description will be directed in part to elements forming part of, or cooperating more directly with, apparatus in accordance with the present invention. It is to be understood that elements not specifically shown or described may take various forms well known to those skilled in the art. For instance, exposure control apparatus embodying the invention may be employed in cameras of either the still or motion picture variety as well as in other apparatus in which the invention would be useful.

Figure 1:
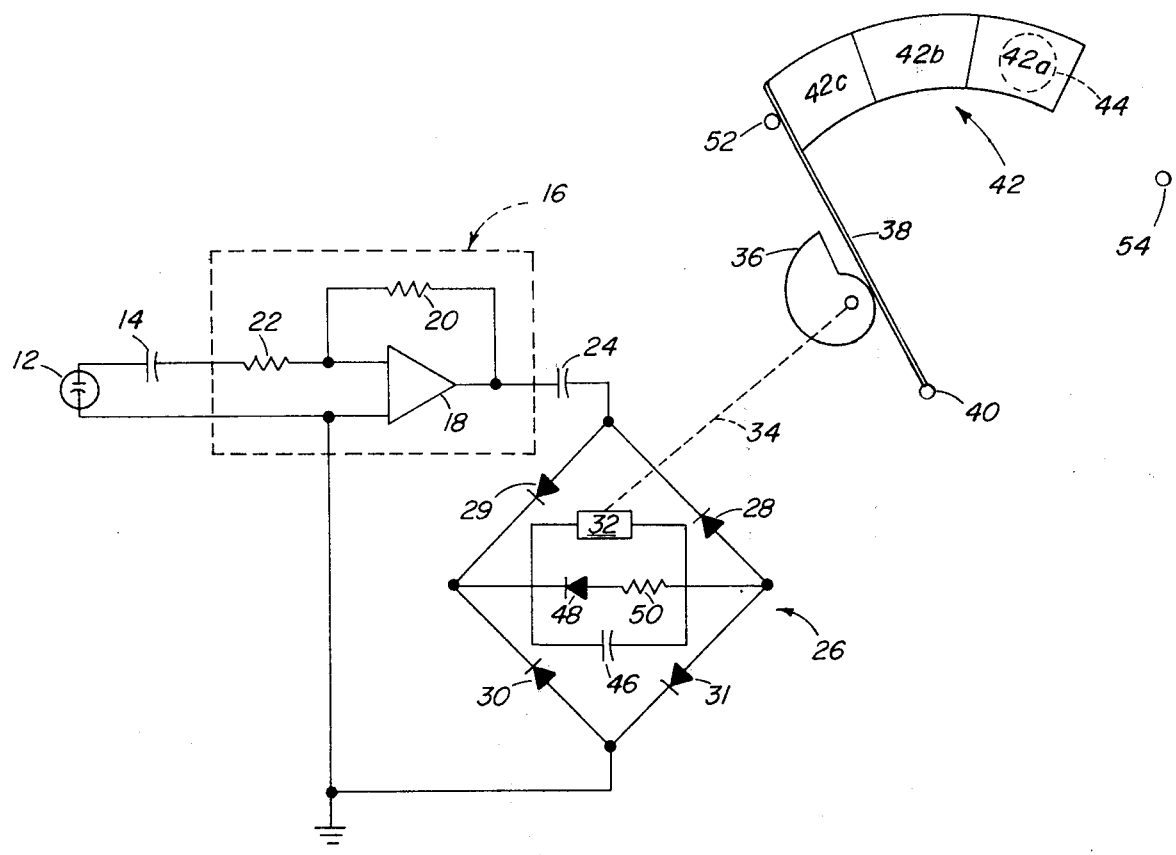
FIG. 1 is a schematic diagram of an exemplary exposure control circuit and related components embodying the present invention.

Turning now to FIG. 1, there is shown an exposure control apparatus which includes a photocell 12 (photovoltaic in the illustrative embodiment) which responds logarithmically to light intensities, producing a voltage whose AC component varies with the power frequency of the incident light. The power frequency applied to is twice the line frequency to an artificial light source. The voltage produced by photocell 12 would have a DC component proportional to the average light intensity.

If the intensity of the brightest light in the power frequency cycle is represented by $I_b$ and that of the dimmest light by $I_d$, the AC voltage V produced by photocell 12 would be proportional to log $I_b$ minus log $I_d$, or log $(I_b/I_d)$.

Capacitor 14 blocks the DC component of voltage V, passing only the AC component to a high input impedance AC amplifier 16. Amplifier 16 includes an operational amplifier 18 with a resistive feedback loop comprising a resistor 20. The voltage gain K of amplifier 16 is given by:

$$K = R_1/Z \qquad (1)$$

where $R_1$ is the value of resistor 20 and Z is the impedance of capacitor 14 and a resistor 22.

A capacitor 24 blocks the DC component of the amplifier output which is fed to a bridge circuit 26 having diodes 28–31 for rectifying the current to an electromechanical control means 32 which provides rotational drive (shown symbolically by broken line 34) to a cam 36. Rotation of the cam deflects an arm 38 against a restoring force such as a spring, not shown. Arm 38 is pivoted at one end 40 and carries a graded filter 42 at the other end, part of which covers lens aperture 44. The filter has three distinct areas 42a, 42b and 42c which color compensate the light for the spectral characteristics of the film. For instance area 42a might compensate for natural light, areas 42b for incandescent light and 42c for fluorescent light. Of course, one of the filter areas may have no filter element if the film is color corrected for the associated light source.

Assuming that the light source was operating at 60 cycles per second, there would be a residual 240 cycle per second ripple current (or four times the line frequency) at control means 32. A capacitor 46 across control means 32 shorts out this AC component. A zener diode 48 is arranged across control means 32 to break down at a predetermined voltage. However, a resistance load 50 in series with diode 48 insures that some portion of the current will pass through control means 32 after the diode has broken down.

Operation

Assuming that an artificial light source is operating on a power line of, say, 60 cycles per second, the power frequency will be twice the line frequency, or 120 cycles per second. Tungsten and fluoresecent lamps reproduce the power frequency with different fidelity. That is, the instantaneous illumination from a fluorescent lamp will much more closely follow the power curve than will the illumination from a tungsten lamp, the latter tending to have less difference between the brightest and dimmest illumination during a cycle. Of course the intensity of light from natural sources does not vary significantly with frequencies in the order of 60 Hertz, and will exhibit substantially constant illumination.

As stated hereinbefore, the flicker ratio of a light source is the ratio of intensities of the brightest light to the dimmest light during a given time period. Therefore, the flicker ratio of a fluorescent lamp will be much greater than that of an incandescent lamp. Natural light will have a flicker ratio of approximately one, as will direct current powered light.

When light from one of these sources impinges upon photocell 12, the photocell will respond logarithmically, producing an AC output voltage proportional to the log of the flicker ratio. It has been observed that this quantity is as much as ten times greater for fluorescent as for incandescent sources regardless of the wattage of the lamps.

The output of capacitor 14, which is determined by the fractional variation in light intensity rather than the magnitudes of illumination, is amplified at 16 and rectified by bridge 26. Bridge current drives control means 32 so that for low currents (representative of natural scene light) filter area 42a covers lens aperture 44, for medium currents (representative of incandescent sources) area 42b is in the optical path and for high currents (representative of fluorescent light) filter area 42c is in the optical path.

On a scale of ten, it has been found that the following approximate ranges of voltage will be found across bridge 26 for natural, incandescent and fluorescent light:

TABLE 1

| Source | Approximate Voltage Range |
| --- | --- |
| Natural | 0 to 0.1 |
| Incandescent | 0.5 to 1.0 |
| Fluorescent | 9 to 10 |

If control means 32 is a linear device filter 42 will move linearly with the current through the control means. In order to make it possible to space filter areas 42a, 42b and 42c uniformly along the arc of filter 42, I have provided zener diode 48 and resistor 50. Diode 48 will break down at the lowest voltage indicative of incandescent light (0.5 on the scale of ten of Table 1). The resistive load 50 has been chosen to have a value of 1/20 the internal resistance of control means 32 so that upon breakdown of diode 48, 95% of the current is shunted through resistor 50 and 5% of the current is supplied to control means 32.

Figure 2:
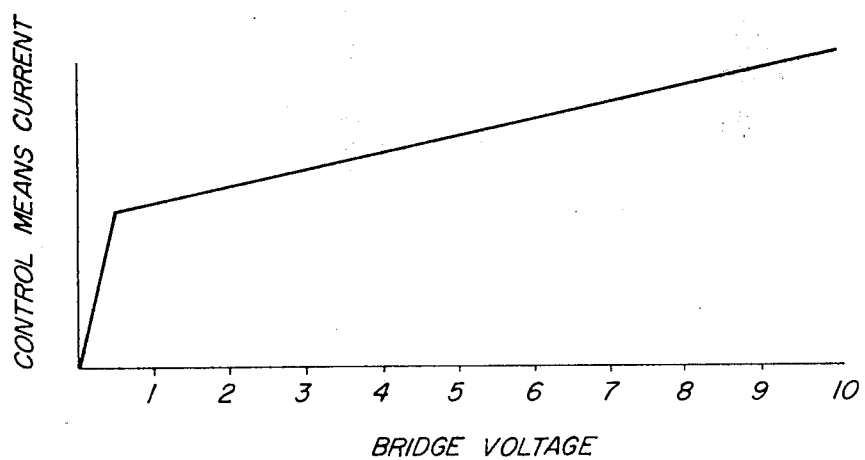
FIG. 2 is a plot of filter movement and/or control current versus the voltage across the bridge in FIG. 1.

A plot of the current through control means 32 versus the voltage over bridge 26 is shown in FIG. 2. When the scene is illuminated with natural light, and voltage is less than 0.1 on the scale, and filter 42 rests against a stop 52 (FIG. 1). For incandescent illumination, the voltage is between 0.5 and 1 on the scale, and filter area 42b is in the optical path. As the voltage reaches 9 on the scale, filter 42 comes to rest against stop 54 so that filter area 42a will be in the optical path of the aperture 44. Filter 42 will track the current through control means 32 except when the filter rests on either of stops 52 or 54.

It will be appreciated that the scene may be illuminated by mixtures of light, i.e., light from a plurality of different source types. The voltage across bridge 26 would be somewhere between (1) 0.1 and 0.5 on the scale if the light were a mixture of natural and incandescent and (2) 1.0 and 9.0 if the light were a mixture of incandescent and fluorescent. If such conditions were anticipated, appropriate filters could be placed between areas 42a and 42b and between areas 42b and 42c to compensate for the light mixtures.

I have also found that it may be desirable to place a minus infrared filter such as heat absorbing glass over photocell 12. This insures that the photocell sees and responds to only visible light.

The invention has been described in detail with particular reference to a preferred embodiment thereof, but it will be understood that variations and modifications can be effected within the spirit and scope of the invention. For example, the circuit shown in FIG. 1 is purely exemplary, and of course other equivalent circuits will occur to those skilled in the art. Further, control means 32 may be used to adjust a mechanism for encoding the film, such as by flashing the frame edge, with an indication of the illumination type. This code could be used to adjust a printer or other image projectors to thereby provide color correction.

I claim:

1. In a photographic apparatus of the type in which a photosensitive material having a predetermined color temperature balance can be imagewise exposed to light emanating primarily from one of at least three light sources of differing color temperature, each of such sources exhibiting characteristically different flicker ratios, means for controlling the color balance of photographic images produced from a photosensitive material in accordance with the color temperature of the light source used to imagewise expose such material, said control means comprising:

(a) means for detecting the flicker ratio of the light used to expose such material and for producing a signal having a characteristic indicative of either (1) sunlight, having a flicker ratio of approximately unity, (2) a first source of artifical light having a flicker ratio measurably in excess of unity, or (3) a second source of artificial light having a flicker ratio measurably in excess of the flicker ratio of the first source of artificial light; and (b) means responsive solely to said signal for altering the color content of light used to produce said photographic images.

2. The apparatus as defined in claim 1 wherein said altering means comprises means for altering the exposure of said photosensitive material.

3. The apparatus as defined in claim 2 wherein said exposure altering means comprises means for positioning different color filters between the exposing source and said photosensitive material.

4. The apparatus as defined in claim 1 wherein said detecting means comprises a photoelectric circuit including a photocell which responds logarithmically to the intensity of light incident thereon.

5. The apparatus as defined in claim 4 wherein said photoelectric circuit further comprises capacitive coupling means electrically connecting said photocell and said altering means for blocking any direct current component of the photocell output, whereby said altering means is responsive to the flicker ratio of the light incident on the photocell and is independent of the average intensity of such light.

6. In apparatus of the type in which photosensitive material having a predetermined color temperature balance is imagewise exposed to light emanating primarily from one of at least three light sources having characteristically different color temperatures and flicker ratios, the improvement comprising:

(a) means for detecting the different flicker ratios of the three exposing light sources and for producing a signal having a characteristic indicative of the detected flicker ratio; and (b) means responsive solely to said signal for controlling the color balance of photographic images ultimately produced from an exposed photosensitive material.

* * * * *